(12) United States Patent
Arnold

(10) Patent No.: US 7,690,159 B1
(45) Date of Patent: Apr. 6, 2010

(54) RELOCATABLE PERSONAL AND/OR PET SAFETY APPLIANCE

(76) Inventor: Floyd Arnold, 3325 Las Casas Hwy., Murfreesboro, TN (US) 37130

( * ) Notice: Subject to any disclaimer, the term of this patent is extended or adjusted under 35 U.S.C. 154(b) by 342 days.

(21) Appl. No.: 11/725,208

(22) Filed: Mar. 16, 2007

(51) Int. Cl.
| | |
|---|---|
| E04H 1/00 | (2006.01) |
| E04B 1/34 | (2006.01) |
| E04H 9/00 | (2006.01) |
| E05G 1/04 | (2006.01) |
| E05B 65/06 | (2006.01) |
| A47B 3/00 | (2006.01) |
| E04B 1/98 | (2006.01) |
| E02D 27/00 | (2006.01) |

(52) U.S. Cl. .................... 52/167.1; 52/79.5; 52/143; 52/79.1; 52/169.6; 109/1 S; 109/59 R; 49/394; 108/35; 108/40

(58) Field of Classification Search ............ 52/69, 52/167.1, 169.6; 108/6, 42, 108, 33; 211/119.004; 297/147

See application file for complete search history.

(56) References Cited

U.S. PATENT DOCUMENTS

| | | | | |
|---|---|---|---|---|
| 3,744,195 | A | | 7/1973 | Ferkich .................... 52/63 |
| 4,126,972 | A | | 11/1978 | Silen ....................... 52/34 |
| 4,331,252 | A | | 5/1982 | Carren et al. ................ 220/5 |
| 4,438,606 | A | | 3/1984 | Chardon et al. ............. 52/79.1 |
| 4,460,215 | A | * | 7/1984 | Chamberlain et al. ......... 297/14 |
| 4,787,181 | A | | 11/1988 | Witten et al. ................ 52/79.1 |
| 5,376,315 | A | | 12/1994 | Fricke ...................... 264/31 |
| 5,481,837 | A | | 1/1996 | Minks, Jr. .................. 52/169.6 |
| 5,707,126 | A | * | 1/1998 | Neufeld et al. .............. 312/245 |
| 5,813,174 | A | | 9/1998 | Waller ...................... 52/79.1 |
| 5,848,500 | A | | 12/1998 | Kirk ........................ 52/79.1 |
| 5,924,781 | A | * | 7/1999 | Mitchell .................... 312/245 |
| 5,953,866 | A | | 9/1999 | Poole ....................... 52/169.6 |
| 5,979,128 | A | | 11/1999 | Parsons ..................... 52/169.6 |

(Continued)

*Primary Examiner*—Brian E Glessner
*Assistant Examiner*—Omar Hijaz
(74) *Attorney, Agent, or Firm*—Brian S. Steinberger; Law Offices of Brian S. Steinberger, P.A.

(57) ABSTRACT

Relocatable personal and/or pet safety shelters for protecting occupants from dangerous conditions such as those from hurricanes and tornadoes. The shelters can include metal wall and ceiling panels of approximately 10 gage to approximately 12 gage thick and be able to withstand winds of up to approximately 250 miles per hour or greater, and be able to withstand a projectile such as 2 inch by 4 inch wood member shot at approximately 100 miles per hour from penetrating inside. The shelter can have a length of approximately 60 inches, a width of approximately 30 inches, a height of approximately 55 inches, with a total weight of up to approximately 940 pounds. The shelter can have fixed bench seats along opposite sides of the door from each other, and be attached in a fixed horizontal orientation above the floor by elongated L-shaped brackets that are attached to the walls be removable fasteners. The bench seats can also be attached by hinges so that the bench seats can have folded up positions adjacent to side walls and can fold down to horizontal positions to allow occupants to sit thereon. A fold down table can be included to fold down between the two bench seats when being used. A safety window such as plexiglass, can be formed in the door to allow the occupants to see outside environmental conditions. The shelter can be fastened to a concrete pad base, or driveway or concrete floor and the like, both inside and outside of a garage, a home, a trailer, and the like.

15 Claims, 14 Drawing Sheets

U.S. PATENT DOCUMENTS

| | | | |
|---|---|---|---|
| 6,003,271 A | 12/1999 | Boyer et al. | 52/79.5 |
| 6,131,343 A | 10/2000 | Jackson, Jr. | 52/86 |
| 6,151,841 A | 11/2000 | Green | 52/79.4 |
| 6,161,345 A | 12/2000 | Hope et al. | 52/169.6 |
| 6,308,466 B1 | 10/2001 | Moriarty | 52/79.1 |
| 6,334,278 B1 * | 1/2002 | Arnold | 52/79.1 |
| 6,343,443 B1 | 2/2002 | Tylicki, Jr. | 52/79.1 |
| 6,539,674 B2 | 4/2003 | Arnold | 52/79.1 |
| 6,604,471 B1 * | 8/2003 | Tarver, Jr. | 108/40 |
| 2002/0069793 A1 * | 6/2002 | Clores | 108/35 |
| 2004/0261667 A1 * | 12/2004 | Ma | 108/42 |
| 2005/0057910 A1 * | 3/2005 | Schnurr | 361/797 |
| 2006/0137578 A1 * | 6/2006 | Noding | 108/152 |
| 2007/0251159 A1 * | 11/2007 | Wagner | 52/19 |

* cited by examiner

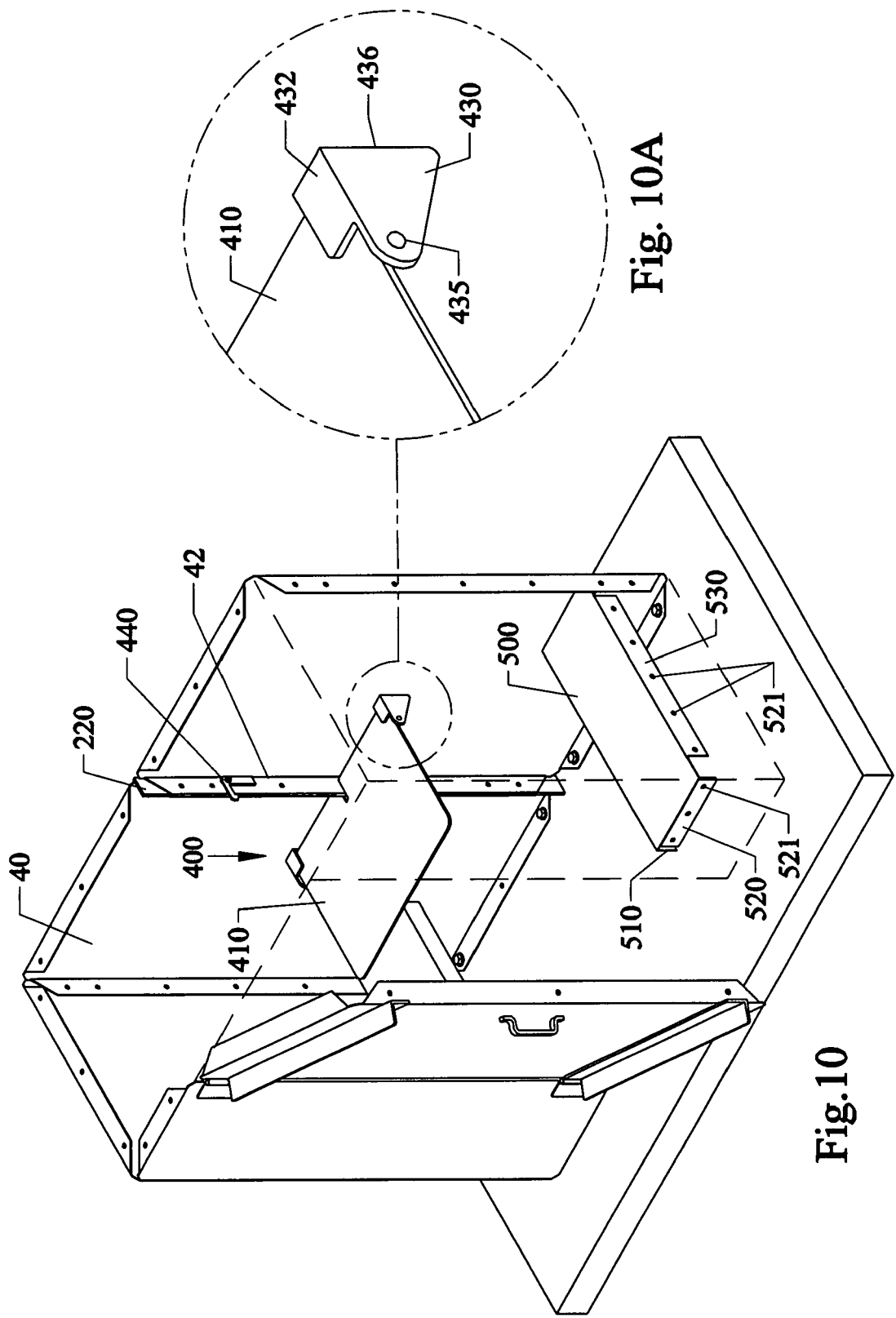

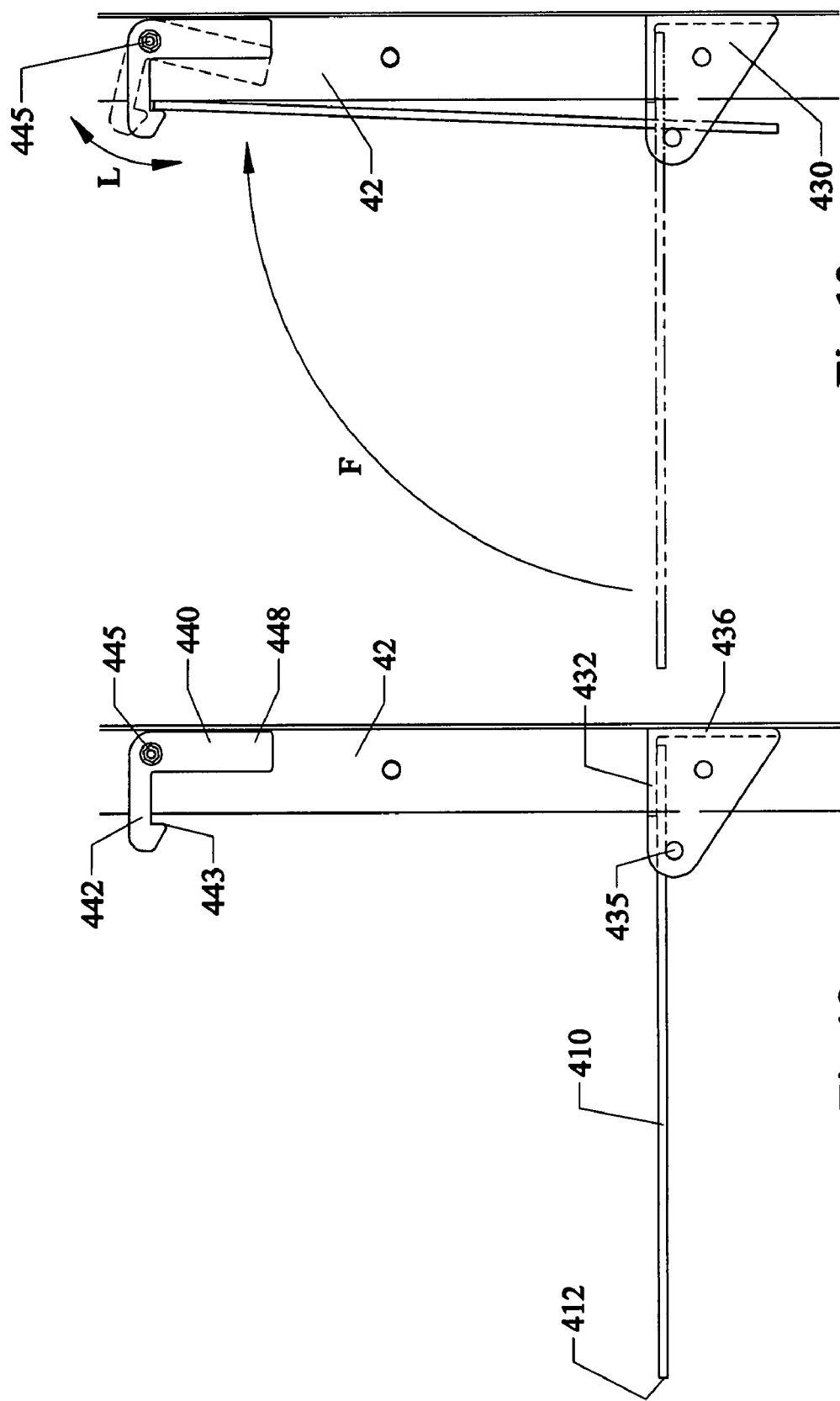

RELOCATABLE PERSONAL AND/OR PET SAFETY APPLIANCE

This invention relates to shelters and in particular to relocatable personal and/or pet safety appliances, and in particular to devices, systems and methods for providing shelters for protecting from storms.

BACKGROUND AND PRIOR ART

Dangerous storms such as hurricanes and tornadoes can occur with little warning. For dangerous fast approaching storms such as hurricanes and tornadoes, safe emergency shelters are needed to protect persons and property from the immediate harm and destruction. Tornadoes are normally seasonal with the months of March through June being the most active. Approximately twenty percent of all tornadoes occur during the months of July through October, and less than ten percent occur during November through January. Tornadoes have been recorded with wind speeds of over 300 mph and can stay on the ground for over one hour. Flying debris can cause much injury and destruction. In recent years, more than 1,000 twisters have killed in excess of one hundred twenty people and caused millions of dollars in property damage in the United States. The dollar figure for the damage caused by tornadoes which have struck Oklahoma City, Okla. in May, 1999 alone has exceeded more than 90 million dollars.

Hurricanes such as Hurricane Andrew, Wilma and Katrina have been known to cause catastrophic damages in the billions of dollars. Regardless of catastrophic damages that occur from tornadoes, hurricanes, and other hazards, relatively little protection against them is provided because of variously prohibitive problems with present protection alternatives. Thus, there exists a need for emergency shelters.

The National Tornado Forum has announced an effort to encourage more people to build "safe rooms" (emergency shelters). The Federal Emergency Management Agency (FEMA) and the Federal National Mortgage Association (Fannie Mae) have programs and financing in place the encourage people to put their families in "safe rooms" (shelters). The average family moves approximately every seven years. Thus, reusable and individualized shelters would be desirable.

A variety of emergency shelters previously have been premanufactured for field uses constructed of cement, steel, fiberglass and other materials. Others have been manufactured in an assembled condition for particular applications. None of these prior art shelters can be site-assembled from matching parts and possess the ability of being moveable or relocateable to another address, should the owner decide to relocate, as this invention.

As is well known between the times a tornado is spotted or warnings are given, there is usually very little time for individuals and families to seek shelter. Additionally, hurricanes have little warnings and are known to change direction with little advance notice.

Since community shelters are not close by to everyone needing the shelter and these types of shelters often do not allow for pets, there is a need for personal relocatable shelters and/or shelters for pets in close proximity to an individual's home.

Various patents have been proposed over the years as shelters but fail to provide safe, reliable, and easily relocatable shelters for individuals and/or pets.

U.S. Pat. No. 6,003,271 to Boyer et al. describes a pre-case security vault device that includes components that can be transported to a construction sites. However, this device includes the assembly of permanently affixing the components together such as by using permanent fasteners such as "welds", and the pouring of "concrete" for floors, and the like, and nonremovable fill such as "grout" at the site, column 1, lines 37-38, column 2, lines 66+, column 3, lines 1-10, 12-25, 60-65, column 4, lines 2-4, 37-43. No where does Boyer et al. describe, nor suggest being able to easily disassemble the vault to be able to be relocated at subsequent sites. Additionally, neither description, nor suggestion is given in the Boyer "vault" for ventilation purposes to allow humans to be sheltered therein. While Boyer mentions that it may be desirable in the background section of the patent to "protect property from damage or theft or to serve as a shelter . . . ", column 1, lines 4-7, the Boyer "vault" device requires that there construction forms a "vapor-tight enclosure . . . and . . . preventing water from seeping into the vault to damage the property in the vault", column 3, lines 14-18. Thus, Boyer is primarily used for protecting property and not as a "shelter" for people. Additionally, Boyer is too large to be used in limited spaces such as garages since it would take up to much space. Furthermore, Boyer has almost no other utility when not being used as a shelter.

Various other types of shelters have also been proposed but also fail to provide safe relocatable habitats for persons and/or pets. See for example, U.S. Pat. No. 4,126,972 to Silen; U.S. Pat. No. 4,331,262 to Carren et al.; U.S. Pat. No. 4,438,606 to Chardon et al.; U.S. Pat. No. 5,953,866 to Poole; U.S. Pat. No. 5,979,128 to Parsons; U.S. Pat. No. 6,131,343 to Jackson; and U.S. Pat. No. 6,161,345 to Hope et al.

Many of these proposed devices has problems that would prohibit their wide use. For example, Carren '606 is primarily used for storing liquids, and not as a protective shelter for people. Chardon '606 is designed for "protecting large-size objects, such as open-air machines, cycles, motorcycles, windsurfers, etc.", abstract, and is also not designed for protecting people.

Poole '866, Parsons '128 and Hope et al. '345 are shelters that require some portion to be inserted into the ground making the shelter permanent and not easily disassembled. In addition the subsurface installation is not practical and in fact dangerous to be used in many low level water regions such as Florida, since storms can potentially flood these below ground shelters.

Further, these patents require users access the shelters through a roof door, which causes inherent problems if debris falls on the top of the shelter and restricting the door from being opened. While Jackson '343 and Silen '972 propose above ground shelters, these devices have another problem which is similar to the other patents referenced above in that none of them would be practical in limited spaces such as garages since the shelters would take up to much space and eliminate space of automobiles, and the like.

Still furthermore, the existing shelter industry does not target shelters to occupants of mobile home parks, and the like.

Thus, the need exists for solutions of the problems with the prior art listed above.

SUMMARY OF THE INVENTION

A primary objective of the present invention is to provide an easily assembled and relocateable personal shelter and/or shelter for pets for protecting occupants from dangerous conditions such as storms that can be produced at a minimal cost.

A secondary objective of the present invention is to provide an easily assembled and relocateable personal shelter and/or shelter for pets for protecting occupants from dangerous conditions such as storms that can be made from a variety of materials such as carbon steel, stainless steel, aluminum, and the like.

A third objective of the present invention is to provide an easily assembled and relocateable personal shelter and/or shelter for pets for protecting occupants from dangerous conditions such as storms that can be structured for protection against a wide selection of hazards.

A fourth objective of the present invention is to provide an easily assembled and relocateable personal shelter and/or shelter for pets for protecting occupants from dangerous conditions such as storms that can be marketed either assembled or unassembled.

A fifth objective of the present invention is to provide an easily assembled and relocateable personal shelter and/or shelter for pets for protecting occupants from dangerous conditions such as storms that can be packaged for low-bulk, inexpensive and convenient transport.

A sixth objective of the present invention is to provide an easily assembled and relocateable personal shelter and/or shelter for pets for protecting occupants from dangerous conditions such as storms that can be assembled by inexperienced persons.

A seventh objective of the present invention is to provide an easily assembled and relocateable personal shelter and/or shelter for pets for protecting occupants from dangerous conditions such as storms that can be made in various sizes to meet different use requirements.

A eighth objective of the present invention is to provide an easily assembled and relocateable personal shelter and/or shelter for pets for protecting occupants from dangerous conditions such as storms that can store food and water to meet disaster needs.

A ninth objective of the present invention is to provide an easily assembled and relocateable personal shelter and/or shelter for pets for protecting occupants from dangerous conditions such as storms that can be easily disassembled and transported to new location should the owner move.

A tenth objective of the present invention is to provide an easily assembled and relocateable personal shelter and/or shelter for pets for protecting occupants from dangerous conditions such as storms that can be tested and certified to withstand hazards.

An eleventh objective of the present invention is to provide an easily assembled and relocateable personal shelter and/or shelter for pets for protecting occupants from dangerous conditions such as storms that can be used as an annex to a building.

A twelfth objective of the present invention is to provide an easily assembled and relocateable personal shelter and/or shelter for pets for protecting occupants from dangerous conditions such as storms that can be positioned within a garage/carport and have plenty of room between the shelter and vehicle(s) stored inside the garage/carport.

A thirteenth objective of the present invention is to provide an easily assembled and relocateable personal shelter and/or shelter for pets for protecting occupants from dangerous conditions such as storms, having a side access door that can be opened from inside or outside the shelter.

A fourteenth objective of the present invention is to provide an easily assembled and relocateable personal shelter and/or shelter for pets for protecting occupants from dangerous conditions such as storms, for above ground use, that can easily be attachable and removable onto concrete floors.

A fifteenth objective of the present invention is to provide an easily assembled and relocateable personal shelter and/or shelter for pets for protecting occupants from dangerous conditions such as storms which is sized to allow users to sit within the shelter.

A sixteenth objective of the present invention is to provide an easily assembled and relocateable personal shelter and/or shelter for pets for protecting occupants from dangerous conditions such as storms that is less obtrusive and takes up less space than traditional storm shelters.

A seventeenth objective of the present invention is to provide an easily assembled and relocateable personal shelter and/or shelter for pets for protecting occupants from dangerous conditions such as storms that can have fold down table inside for occupants An eighteenth objective of the present invention is to provide an easily assembled and relocateable personal shelter and/or shelter for pets for protecting occupants from dangerous conditions such as storms that can have seats for the occupants.

A nineteenth objective of the present invention is to provide an easily assembled and relocateable personal shelter and/or shelter for pets for protecting occupants from dangerous conditions such as storms that can have a table and seats for the occupants.

A twentieth objective of the present invention is to provide an easily assembled and relocateable personal shelter and/or shelter for pets, that can be easily assembled and used in trailer parks, as well as inside or outside of structures such as garages, carports, houses, basements, and the like.

A preferred embodiment of the relocateable shelter includes a rectangular frame formed from panels and members that can be fastened and unfastened together, to form walls and a roof to the frame, and a door that can be attached to one of the walls of the frame for allowing access to an interior of the frame, wherein the frame, panels and door form a shelter allowing persons to seek safety within the shelter. The shelter can be attached to a rectangular concrete foundation beneath the shelter. The shelter can be sized to sizes similar to that of a workbench type table, and be formed from suitable strong materials such as ¼ inch carbon steel plates. The door can be attached to the shelter by a hinge having a step shaped hinge guard for bracing the door to a closed position adjacent to the hinge. Slideable latches can be used to lock the door, where the latches can be accessible to both outside and inside of the shelter to open the door from a closed position. The latches can each include an elongated bar that having one end that slides inside of the shelter to lock the door, and have an outer end having a handle for allowing the door to be opened from outside of the shelter.

The shelter can have bench seats fastened to interior walls to the left and right of the front door so that occupants can easily sit inside of the shelter with clearance above their heads.

A fold down table can be positioned between the bench seats

Windows can be added to the front door with panels that allow light inside the shelter so that occupants know when day and night conditions exist outside the shelter.

This invention makes it possible for a person, family or other group to have a place of security readily available on the interior of structures with concrete floors such as garages and carports or just outside the door of manufacture homes and mobile homes.

Further objects and advantages of this invention will be apparent from the following detailed description of the presently preferred embodiments which are illustrated schematically in the accompanying drawings.

BRIEF DESCRIPTION OF THE FIGURES

FIG. 2A is an enlarged view of a door hinge of FIG. 2.

FIG. 2B is an enlarged view of the latch of FIG. 2.

FIG. 3A is an enlarged view of an upper corner seam of the device in FIG. 3.

FIG. 3B is an enlarged view of a lower corner seam of the device in FIG. 3.

FIG. 4A is an enlarged view of a door hinge of FIG. 4.

FIG. 4B is an enlarged view of the latch of FIG. 4.

FIG. 10 is a partial cross-sectional interior view of the device with bench seats and fold down table in a folded down position.

FIG. 10A is an enlarged view of one of the hinges for the fold down table of FIG. 10.

FIG. 12 is an enlarged side view of the fold down table of FIG. 10 in a down position.

FIG. 13 is an enlarged side view of the fold down table of FIG. 11 in an up position.

DESCRIPTION OF THE PREFERRED EMBODIMENTS

Figure 1:
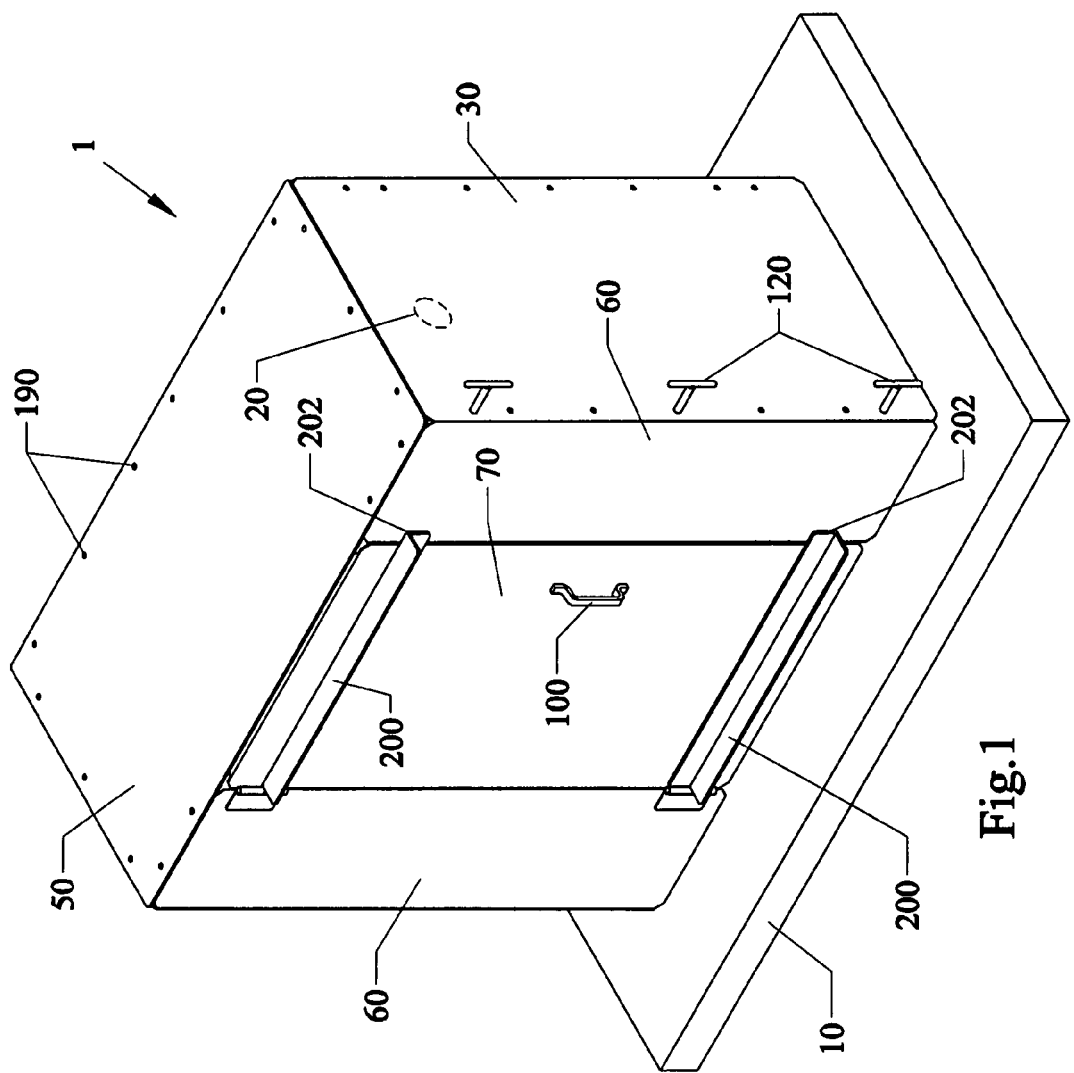
FIG. 1 is an upper perspective view of a relocatable personal and/or pet safety device.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of the components will now be described.
1. Device/Shelter
10 Concrete foundation
20 Optional Ventilation Holes
30 end panels
31 fastening holes
32 upper and lower bent edges
34 upper angled corner
35 holes in panels 30 for handles 120
39 bottom bent edge
40 Back panels
41 fastening holes
42 Top and Bottom and side bent edges of back panels
50 Top/Roof Panel
51 rounded corner
60 Front panels
61 fastening holes in bent edges
62 Tope and Bottom and side bent edges of front panels
69 upper angled corner
69 bottom bent edge
70 door
80 Vertical Longitudinal L shaped door brace plate
82 legs of door brace 80
84 second leg perpendicular to leg 82
92 legs of hinge guard
100 Door Handle
110 hinges
112 front plate of hinge
115 cotter pin for hinge
120 Safe T Handles
122 outside handle of 120
124 enlarged stop collars
126 elongated bars
128 narrow tip end
130 L shaped support bracket for safe T handle
135 holes in L bracket 130
170 L shaped door handle bracket
172 leg
174 second leg
175 holes in leg 174
190 Fasteners, that include bolts, screws, washers
200 Outside Horizontal L shaped cross bars
202 Right End of cross bars
205 Inside Horizontal L shaped cross bars with angled ends
210 Fasteners, that include bolts, screws, washers
220 Panel spacers between each bent edge of panels
500 Benches
510 Front bent edge/wall.
520 Side L shaped brackets
521 through holes for fasteners
530 rear bent edge/wall
531 through holes for fasteners
400 Table
410 rectangular table top
420 bar fixably fastened underneath table top
430 hinge brackets for table
432 stopper portion of bracket
435 hole for ends of pivoting bar 420
436 rear wall of hinge brackets
440 hook latch for table
442 upper hook end of latch
443 front end of upper hook end
445 pivoting fastener
448 bottom leg of latch
600 Windows
610 opaque panel
620 S/Z shaped brackets
650 Second version of window
660 rectangular frame The subject invention relates to the inventors previous U.S. Pat. No. 6,539,674 to Arnold and U.S. Pat. No. 6,334,278 to Arnold, both of which are incorporated by reference. The subject shelter invention is similar in construction and components to the parent invention shelters which have been tested and certified to withstand 450 miles per hour winds, by Certified Testing Laboratory, 7252 Narcoossee Road, Orlando, Fla., 32822, an independent, Miami, Dade County approved testing laboratory. Thus, the subject invention should at least meet the same testing and criteria as the parent invention shelters and be useful for dangerous storms such as but not limited to hurricanes and tornadoes.

A shelter having less thick walls than the preferred 10 gage was tested with 12 gage steel, and tested at approximately 250 miles per hour wind conditions that also included striking the shelter 1 with a 2"×4" projectile weighing approximately 15 pounds at 100 miles per hour.

Figure 2:
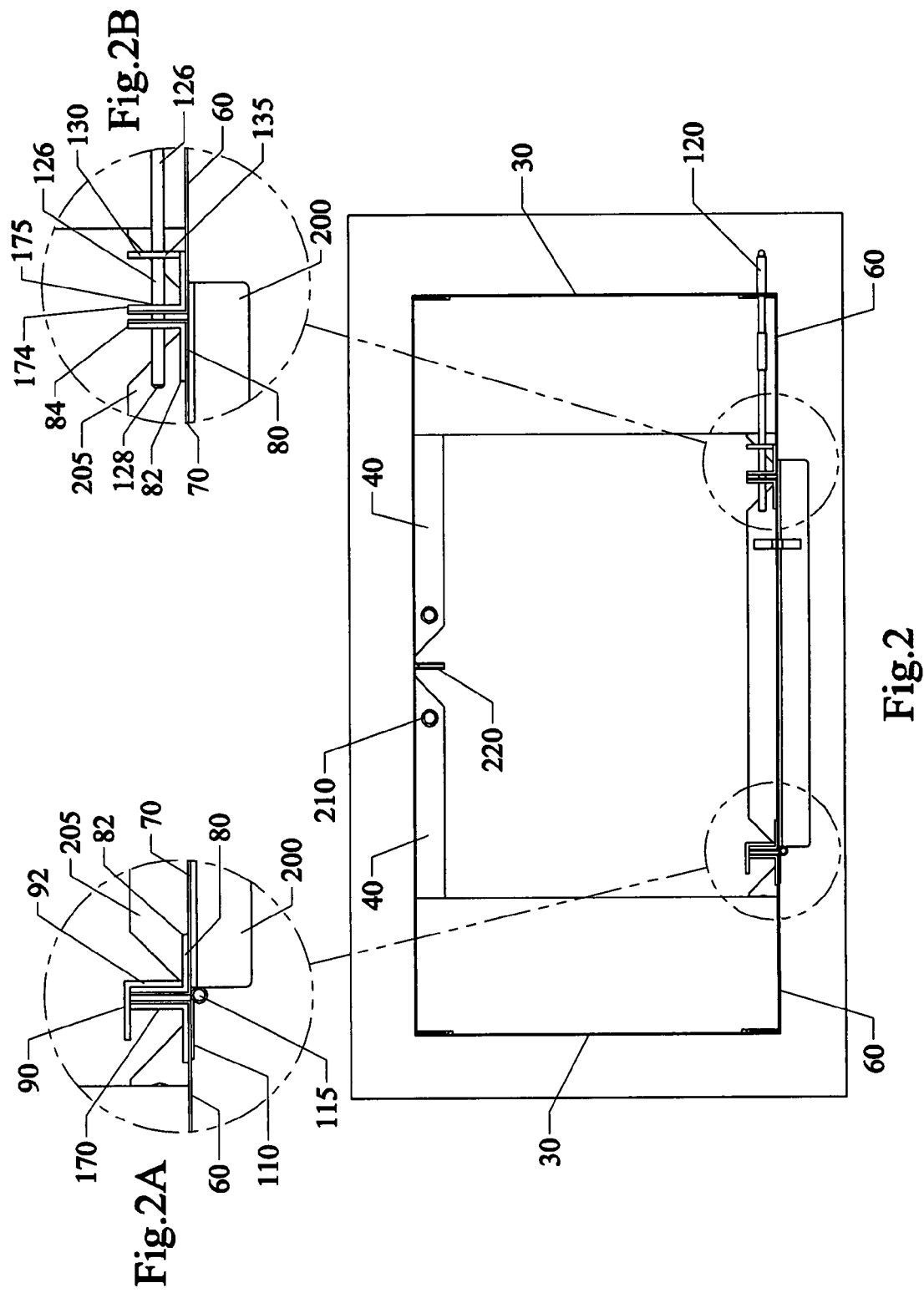
FIG. 2 is a top view of the device of FIG. 1 with door closed and the roof removed.
Figure 3:
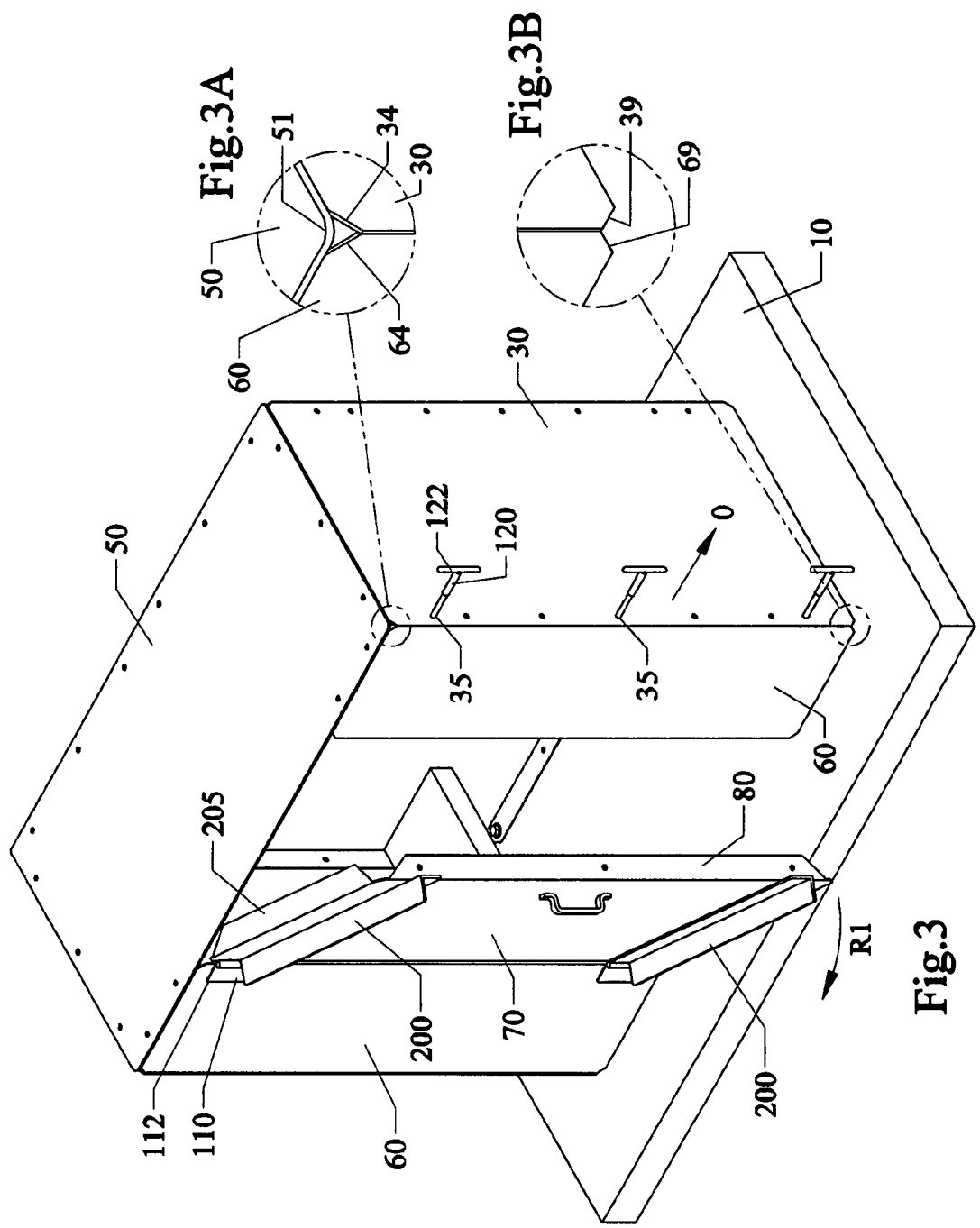
FIG. 3 is another perspective view of the device of FIG. 1 with the door open.

FIG. 1 is an upper perspective view of the relocatable personal and/or pet safety device 1. FIG. 2 is a top view of the device of FIG. 1 with door closed and the roof 50 removed. FIG. 2A is an enlarged view of a door hinge 110 of FIG. 2. FIG. 2B is an enlarged view of the latch of FIG. 2. FIG. 3 is another perspective view of the device 1 of FIG. 1 with the door 70 open. FIG. 3A is an enlarged view of an upper corner seam of the device 1 in FIG. 3. FIG. 3B is an enlarged view of the lower corner seam of the device 1 in FIG. 3.

Figure 4:
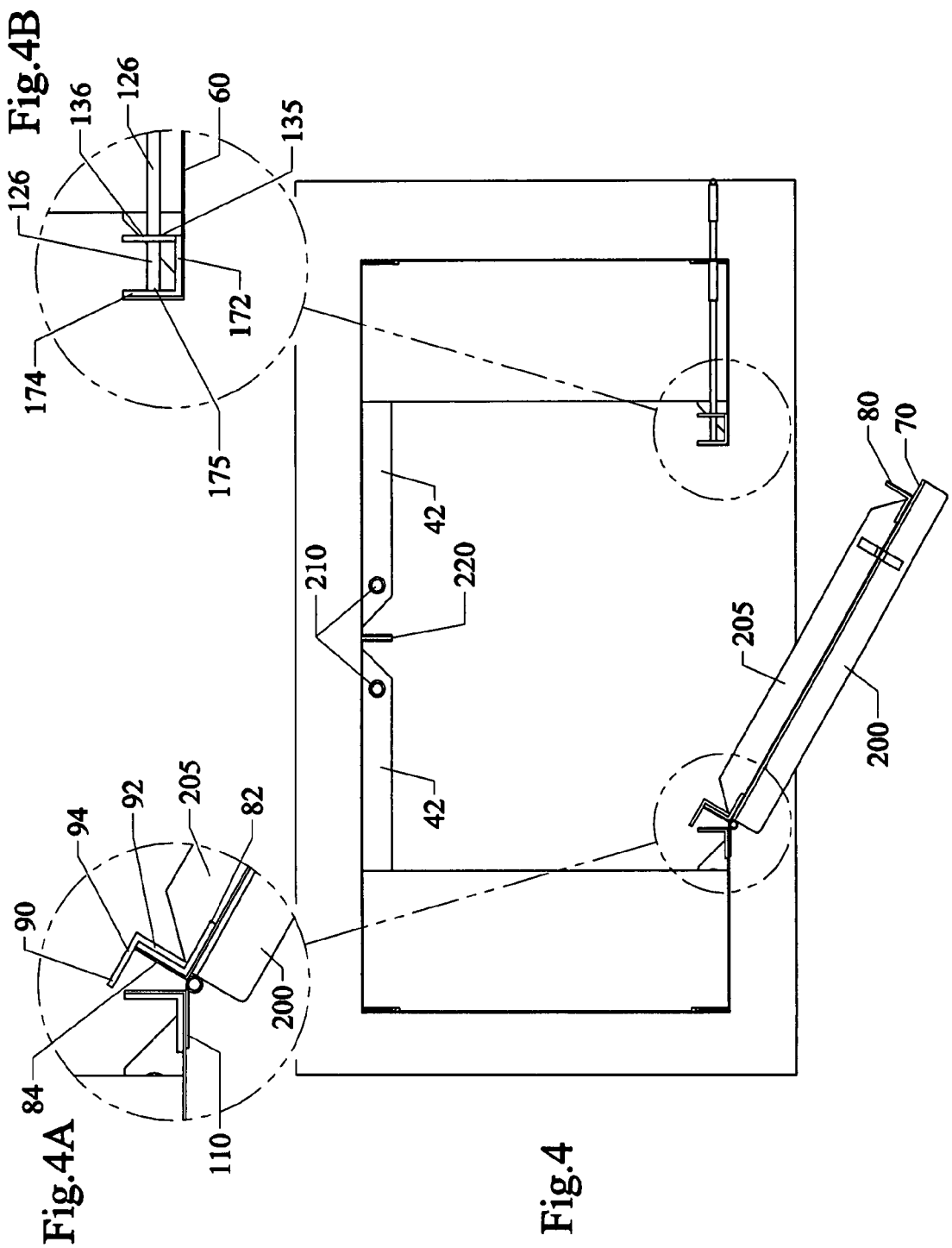
FIG. 4 is a top view of the device of FIG. 3 with door open and the roof removed.
Figure 5:
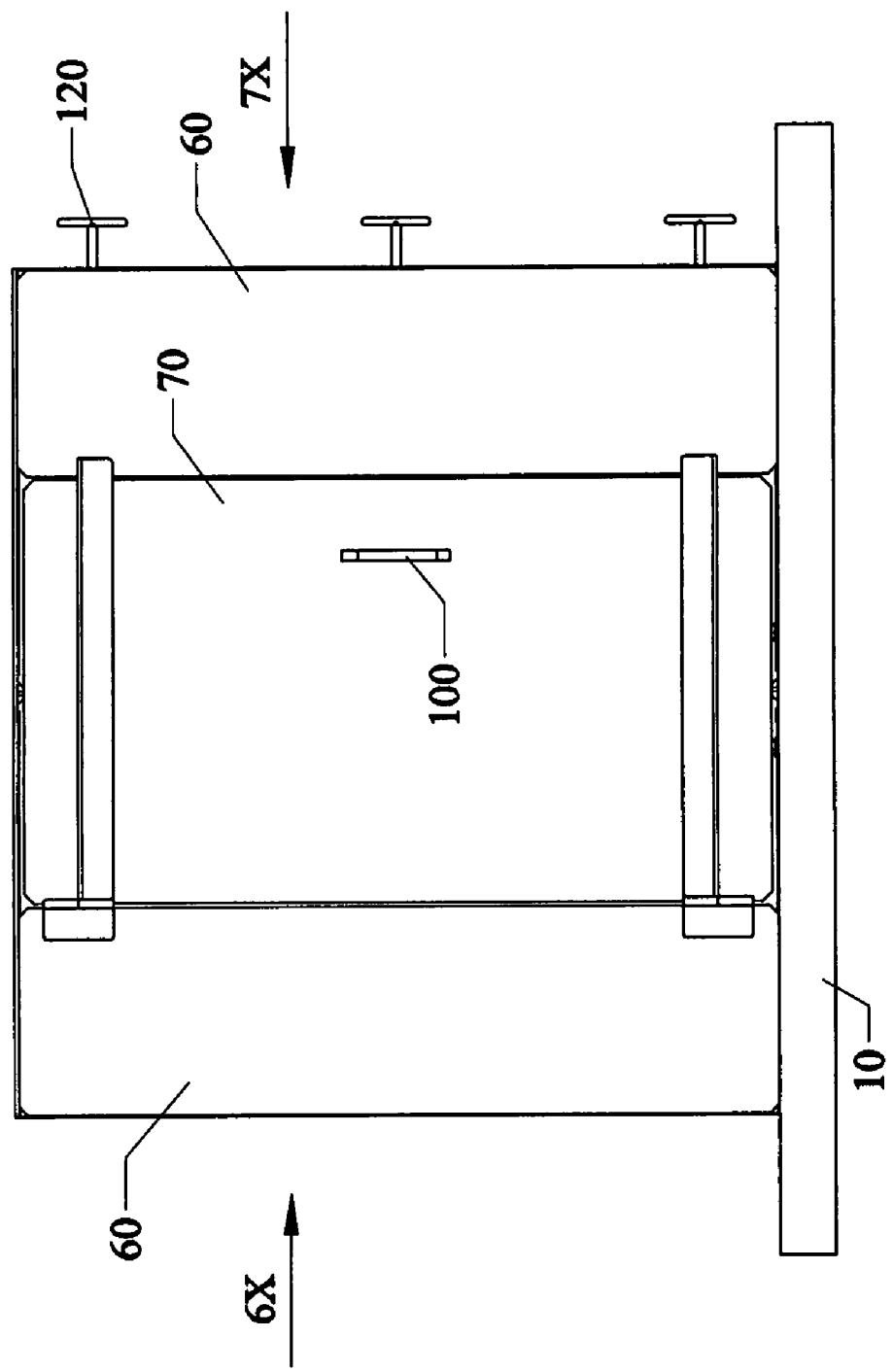
FIG. 5 is a front view of the device of FIG. 1 with the door closed.
Figure 7:
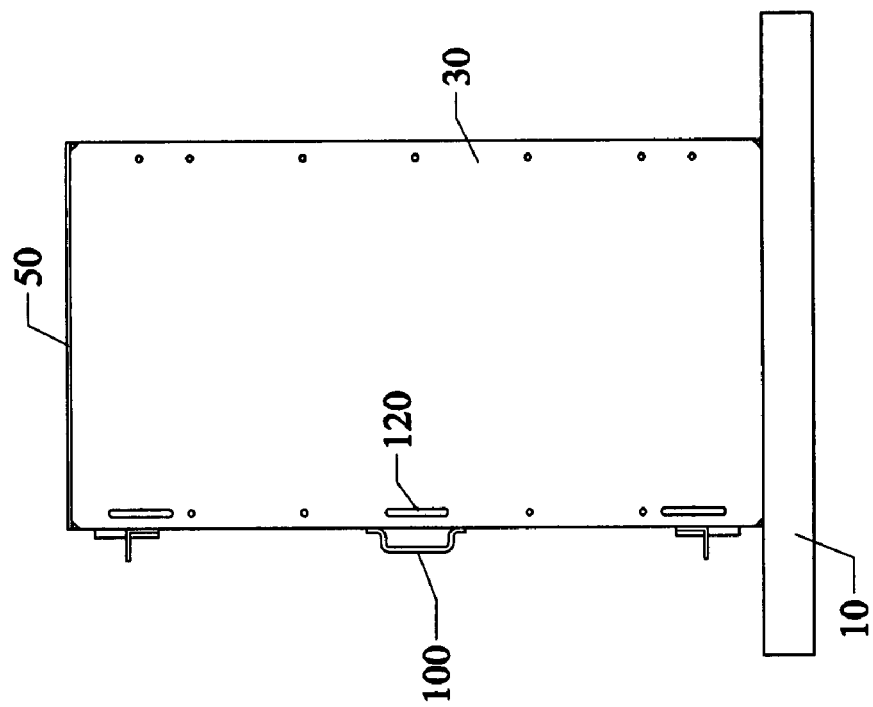
FIG. 7 is a right side view of the device of FIG. 5 along arrow 7X.
Figure 6:
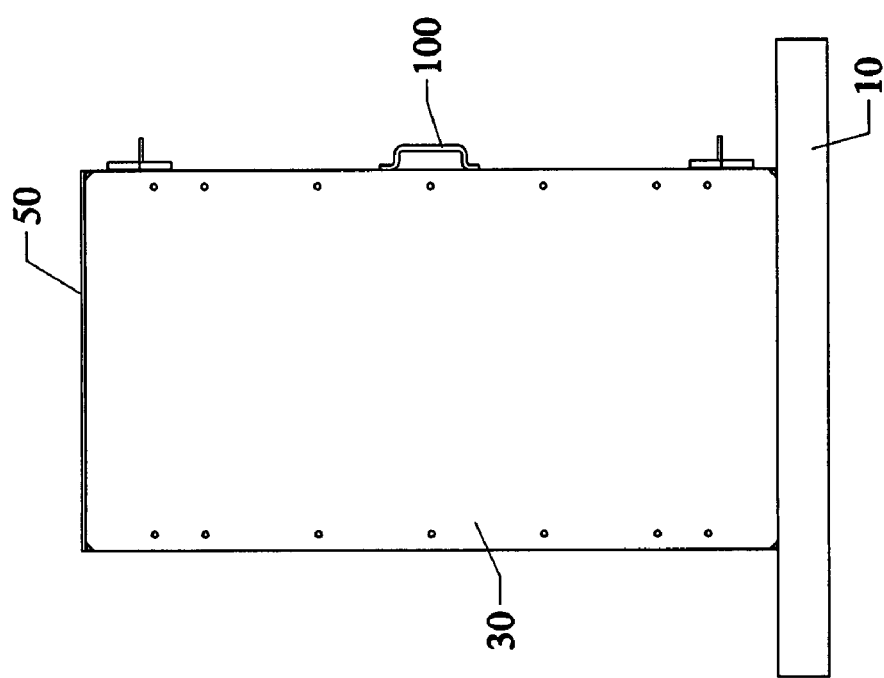
FIG. 6 is a left side view of the device of FIG. 5 along arrow 6X.
Figure 8:
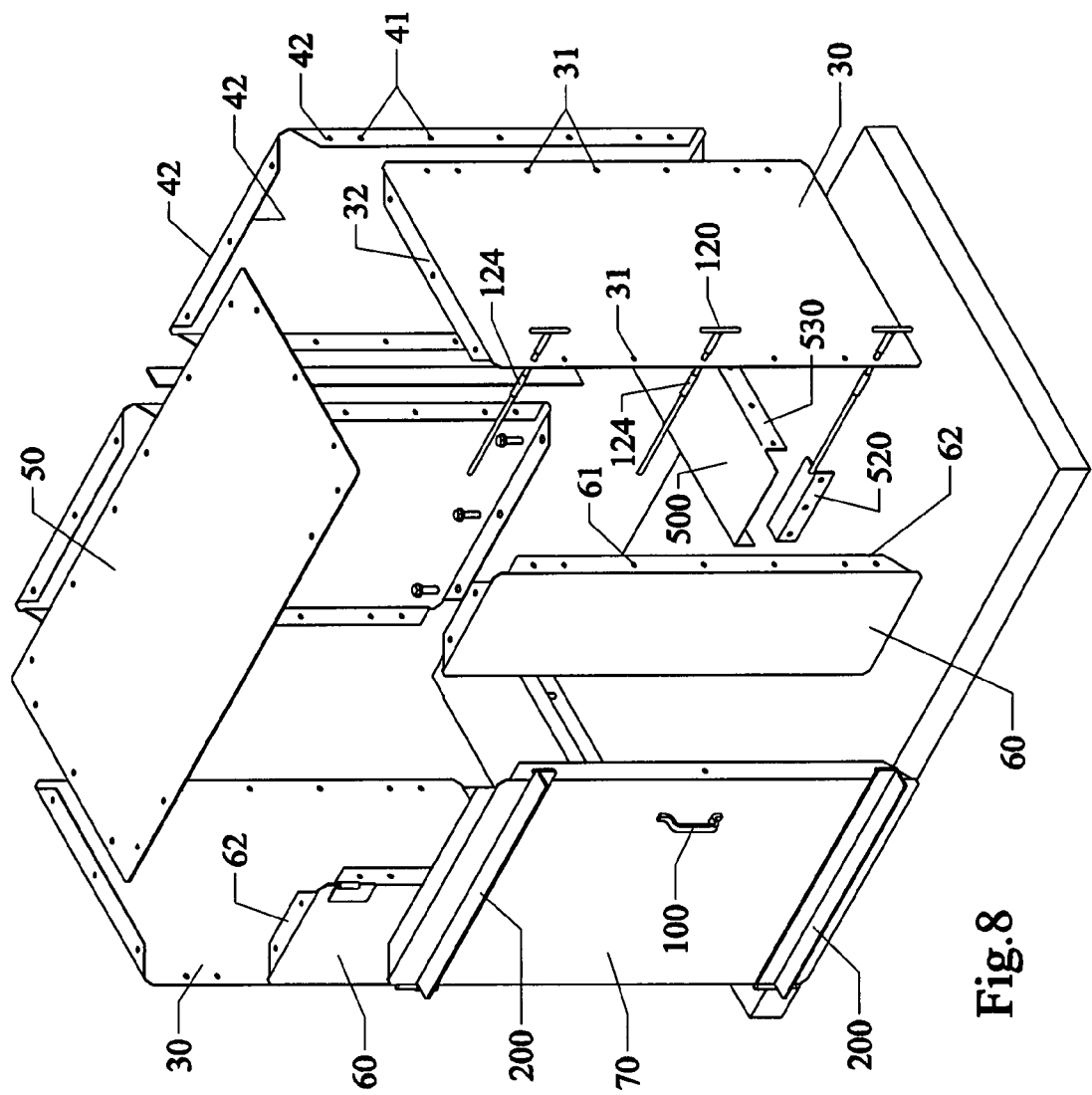
FIG. 8 is an exploded view of the device of the preceding figures.

FIG. 4 is a top view of the device of FIG. 3 with door 70 open and the roof 50 removed. FIG. 4A is an enlarged view of a opened door hinge 110 of FIG. 4. FIG. 4B is an enlarged view of the latch of FIG. 4. FIG. 5 is a front view of the device 1 of FIG. 1 with the door 70 closed. FIG. 6 is a left side view of the device 1 of FIG. 5 along arrow 6X. FIG. 7 is a right side view of the device 1 of FIG. 5 along arrow 7X. FIG. 8 is an exploded view of the device 1 of the preceding figures.

Referring to FIGS. 1-8, shelter 1 can include a concrete foundation 10 that can be rectangular shaped with dimensions of approximately 60 inches wide to approximately 30 inches deep by approximately 55 inches tall. The shelter 1 can have galvanized metal side panels 30, 40, 60, 70 that can be 10 gauge thick, and include an approximately ¼ inch thick plate top/roof panel 50. The shelter 1 can be anchored to the concrete pad 10 by approximately 16 located ½" diameter 4" long bolts.

Referring to FIGS. 1-8, shelter 1 can be a rectangular frame with front side panels 60 on opposite sides of door 70 substantially centered therebetween. Two back panels 40 can be along the rear long side of the shelter 1. End panels 30 can be located on opposite ends of the front and back panels. Each of the end panels 30 can include optional holes 20 that can be used as ventilation openings to access the inside airspace of the shelter 1.

Each of the front and back panels 40, 60 can include four inwardly bent edges 42, 62, respectively about each of their respective four sides. Each of the side panels 30 can include upper and lower bent edges 32 along the upper and bottom edges, respectively. The panels 40, 60 can be attached to end panels 30 by abutting their side bent edges 42, 62 and respectively located through-holes 31, 41, 61 adjacent to one another using fasteners such as but not limited to bolts, screws, and the like, to form a rectangular shape.

A roof panel 50 can be attached to the upper bent edges 32, 42, 62 on all the panels 30, 40, 60 by using fasteners such as not but not limited to bolts, screws, and the like, that pass through through-holes 31, 41, 51 and 61. Similarly, the bottom bent edges 32, 42, 62 of the panels 30, 40, 60 can be attached to a foundation 10 such as concrete, and the like by using similar fasteners such as but not limited to bolts, screws, and the like, that pass through respective through-holes 31, 41, 61.

Foundation 10 can be a raised concrete foundation or be part of an existing concrete floor such as one located in a driveway, carport, garage, and the like. Fasteners 190, can be bolts, screws, washers, and the like. Fasteners 210 can be bolts, and washers, and the like, such as but not limited to approximately four inch concrete bolts with washers, and the like. Additionally, panel spacers 220 can be used between each bent edge of the panels 40 that abut against one another (see for example, FIG. 2).

The assembly and operation of the door 70 will now be described in reference to FIGS. 1-8. Door 70 can be substantially centrally located along one long side of the rectangular shelter 1 between front panels 60. Door 70 can be attached to a left front panel 60 by two hinges 110. Each of the hinges 110 can have a stationary front plate portion 112 that can be fastened by welds, and the like, to the front of left front panel 60 and to the front of right panel 60. The second portion of the hinges 110 can include an L-shaped cross bar 200 that can be similarly fastened by welds, and the like, to the front of door 70. A right end 202 of the cross bars 200 can extend beyond the right edge of the door 70 to cover over a portion of the right panel 60. This extension portion 202 can enhance the structure by preventing the door 70 from opening into the shelter.

A cotter type pin 115 can connect both portions 112, and 200 of the hinges 110 together. Facing inwardly from left front panel 60 can be an L-shaped door jam 170 having one leg 172 fastened to the inside edge of the panel 60 by welds, and the like. The second leg 174 is perpendicular to leg 172. Fastened to the back of door 70 can be a vertical L-shaped door brace 80 having one leg 82 fastened along a left side rear edge of door 70 by welds, and the like. A second leg 84 perpendicular to the first leg 82 can be fastened to one leg 92 of an L-shaped door hinge guard 90. The second leg 94 of the door hinge guard 90 is perpendicular to leg 92, and substantially parallel to door 70. The door 70 can be opened outward by pulling on door handle 100. When door 70 is closed, legs 82, 92 of both door brace 80 and door hinge guard 90 abut against leg 174 of door jam, while leg 94 of door hinge guard 90 abuts about the outer edge of leg 174 can also prevent the door 70 from opening into the interior space of the shelter 1. The integrity of the door 70 can be further enhanced by an inside horizontal L shaped cross bar 205 having angled ends.

The locking and accessing of the door 70 will now be described in reference to FIGS. 1-8. On right end panel 30, additional through-holes 35 exist for the mounting safe-T-handles and allow elongated bars 126 to pass therethrough with handles 122 exterior to the shelter 1. Enlarged stop collars 124 on the elongated bar 126 on both sides of panel 30 restrict the bars 126 from being fully pulled out of or fully pushed into the shelter 1. Opposite the handles 122 is a narrow tip end 128, the relevance of which will be described later. Although three safe-T-handles 120 are shown in parallel along the front edge of right side panel 30, the invention can be practiced with one, two or more than three safe-T-handles as needed. On the back of right front panel 60 is an L-shaped door jam angle bracket 170 having one leg 172 fastened by welds, and the like, to the back side of front right panel 60, with a second leg 174 perpendicular to the first leg 172 having through-holes 175 therethrough for allowing the narrow tip 128 of elongated bar 126 to pass therethrough.

A safe-T-handle L-shaped support bracket 130 has one leg 132 fastened by welds, and the like to inner surface side of leg 172 of the bracket 170. Second leg 134 perpendicular to leg 132 has a through-hole 135 for supporting elongated bar 126 therein. An L-shaped door brace 80 has one leg 82 that is fastened to the rear right edge of door 70, by welds, and the like. The second leg 84 of brace 80 has through-holes 85 for also allowing narrow tip 128 of elongated bar 126 to pass therethrough.

Referring to FIGS. 1-8, while the door 70 is open and has been rotated in the direction of arrow R1, the safe-T-Handles 120 are pulled to the right in the direction of arrow O until left stop collar 124 abuts against panel 30. To close and lock the shelter, the door 70 is closed in the direction of arrow R2 until door hinge guard abuts against door jam angle brace 170. Next, handles 122 are pushed in the direction opposite arrow O so that elongated bar passes through through-holes 35 of panel 30 and through-holes 135 of bracket 130, so that narrow tip 128 passes through through-holes 175 of bracket 170 and through-holes 85 of brace 80 locking the door 70 in a closed position.

Occupants inside shelter 1, can also open the door by gripping elongated bars 126 and sliding them in the direction of arrow O. Likewise, occupants of the shelter 1 can close the shelter door 70 and lock the bars 126 by similar procedures to that described above.

FIG. 7 is a view of the shelter 1 of the preceding figures showing up to five occupants that can include two adults 240, and three children 250, each in sitting positions within the shelter 1. When a storm approaches, the novel invention can be accessed easily by opening the shelter door 70, and having the occupants crawl inside for immediate safety.

As shown in FIGS. 3A and 3B, the upper and lower corners of the shelter can include an upper corner having a rounded top panel edge 51 that meets the upper angled corner edges 34, 64 of end panels 30 and front panels 60. The bottom corners of the shelter can include bent edges 69 of front panel 60 abutting against bent edge 39 of end panel 30 that together can form a bevel type edge.

Bench Seats

Figure 9:
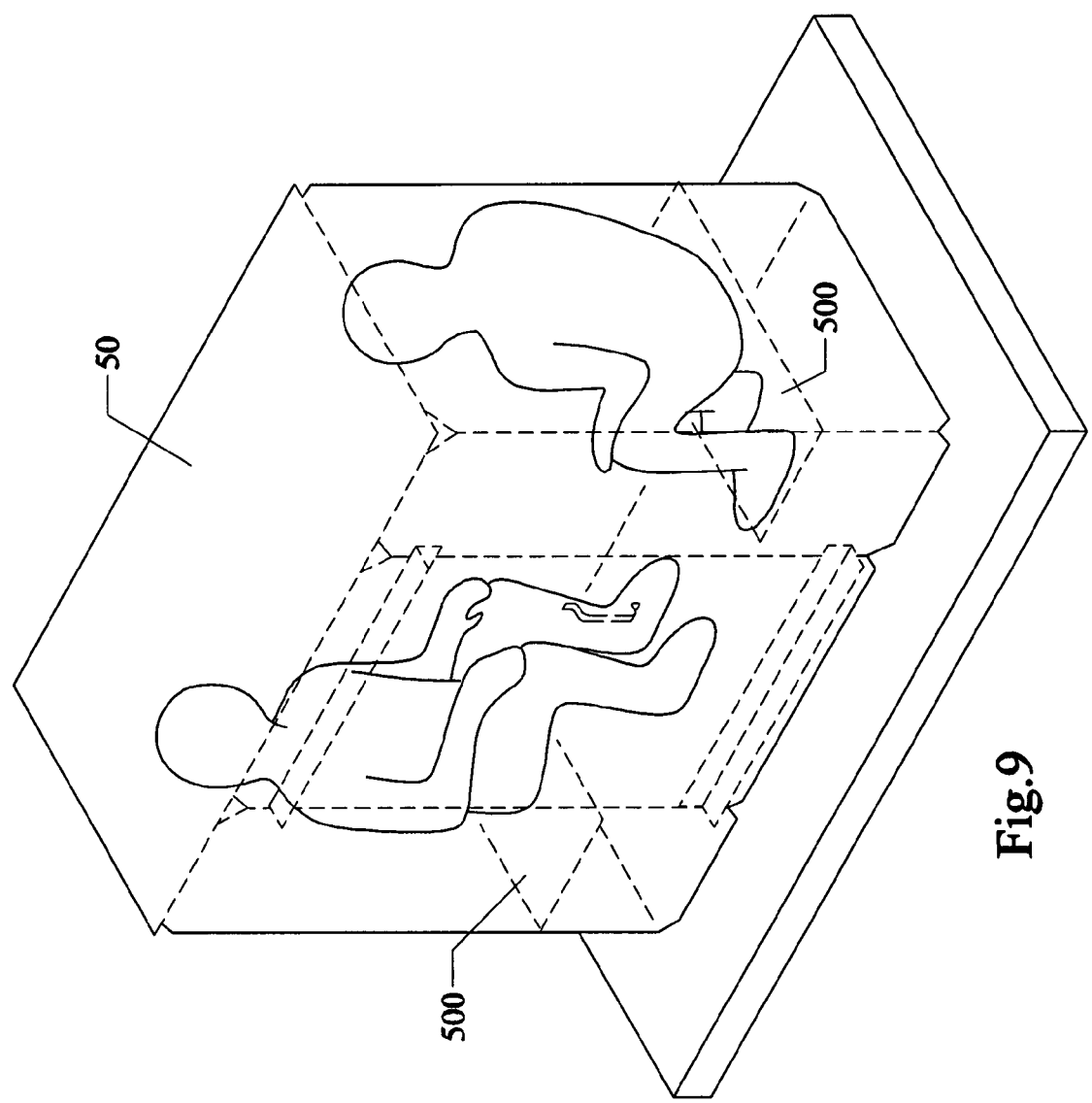
FIG. 9 is a partial interior view of the device of the preceding figures with novel side bench seats.

FIG. 9 is a partial interior view of the device 1 of the preceding figures with novel side bench seats 500. FIG. 10 is a partial cross-sectional interior view of the device 1 with bench seats 500 and fold down table 600 in a folded down position. Referring to FIGS. 8-10, bench seats 500 can include a pair of bench seats 500 inside of the shelter. One bench seat can be attached in a fixed horizontal orientation by the brackets 520, 530 to the interior surfaces of end wall panels 30 inside of the shelter 1 to the left of the door 70. Another bench seat 500 can be attached in a fixed horizontal orientation by brackets 520, 530 to the interior surfaces of end wall panels 30 inside of the shelter 1 to the right of the door 70.

The bench seats 500 can have rear bent edges 530 having through holes 531 where fasteners such as but not limited to bolts, screws and the like, can attach the bench seat to the end wall panels 30 of the shelter 1.

Underneath the side edges of bench seats 500 can be elongated L shaped brackets 520 with an elongated horizontal leg perpendicular to an elongated vertical leg. The elongated vertical legs can have through-holes 521 therethrough for allowing the end bracket to be attached to front walls 60 with removable fasteners, such as but not limited to bolts, screws, and the like.

The front edge of the bench seats 500 can have downwardly bent edges 510 that form a front wall portion while the rear bent wall 530 forms a rear wall. The rear wall 530 can have a shorter length than the front wall 510 so that the end brackets 520 fit under the opposite side edges of the rectangular upper panel portion of bench seat 500, with the front end of the L shaped brackets 520 behind the front wall 510 and a rear end of the L shaped brackets 520 adjacent to the end wall panels 30 of the shelter 1.

Occupants such as adults inside of the shelter 1 can easily sit on the bench seats 500 and have enough headroom to have clearance below the roof/top panel.

Folding Table Top

Figures 11, 11A:
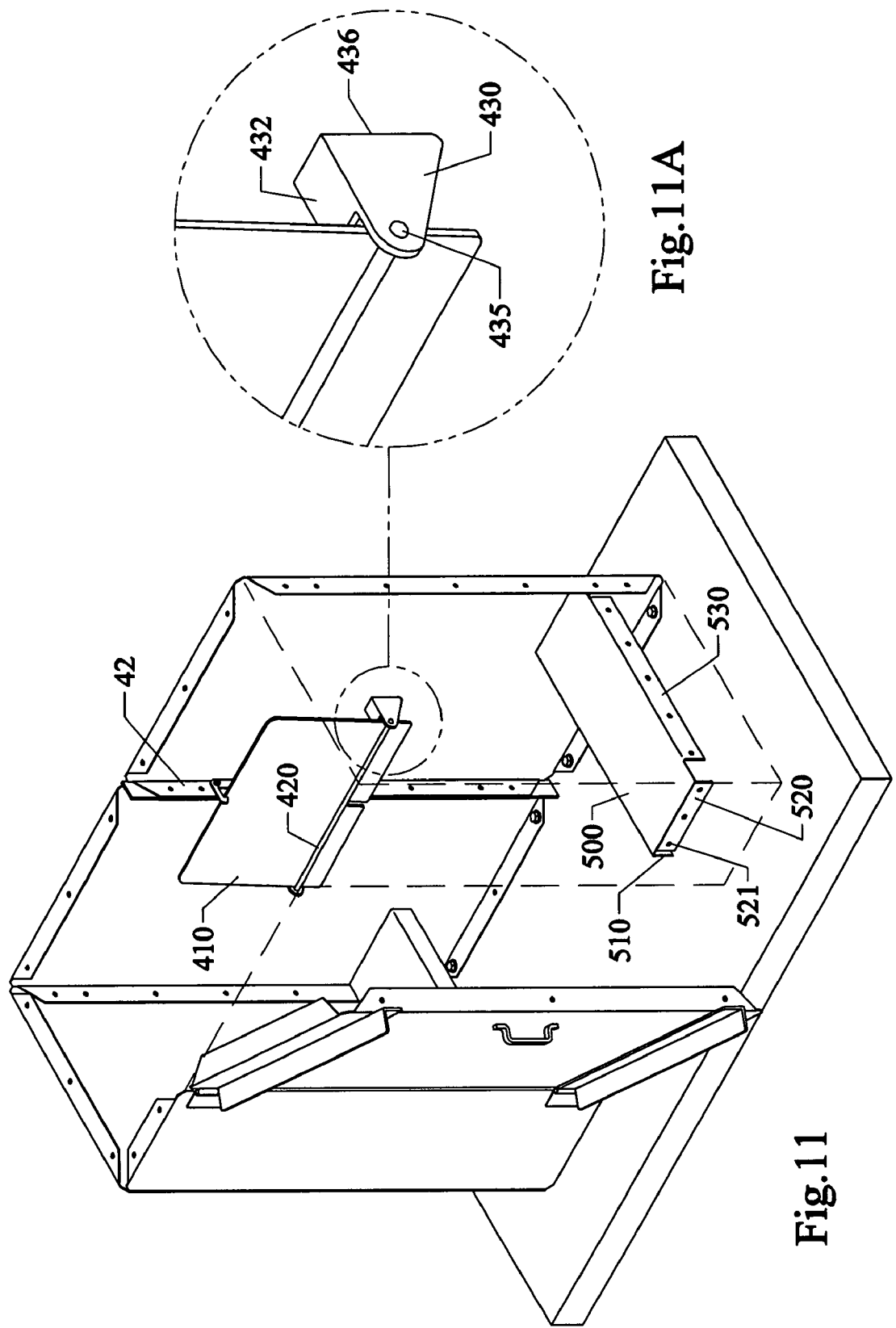
FIG. 11 is a partial cross-sectional interior view of the device with bench seats and fold down table in a folded up position.
FIG. 11A is an enlarged view of one of the hinges for the fold down table of FIG. 11.
Figure 14:
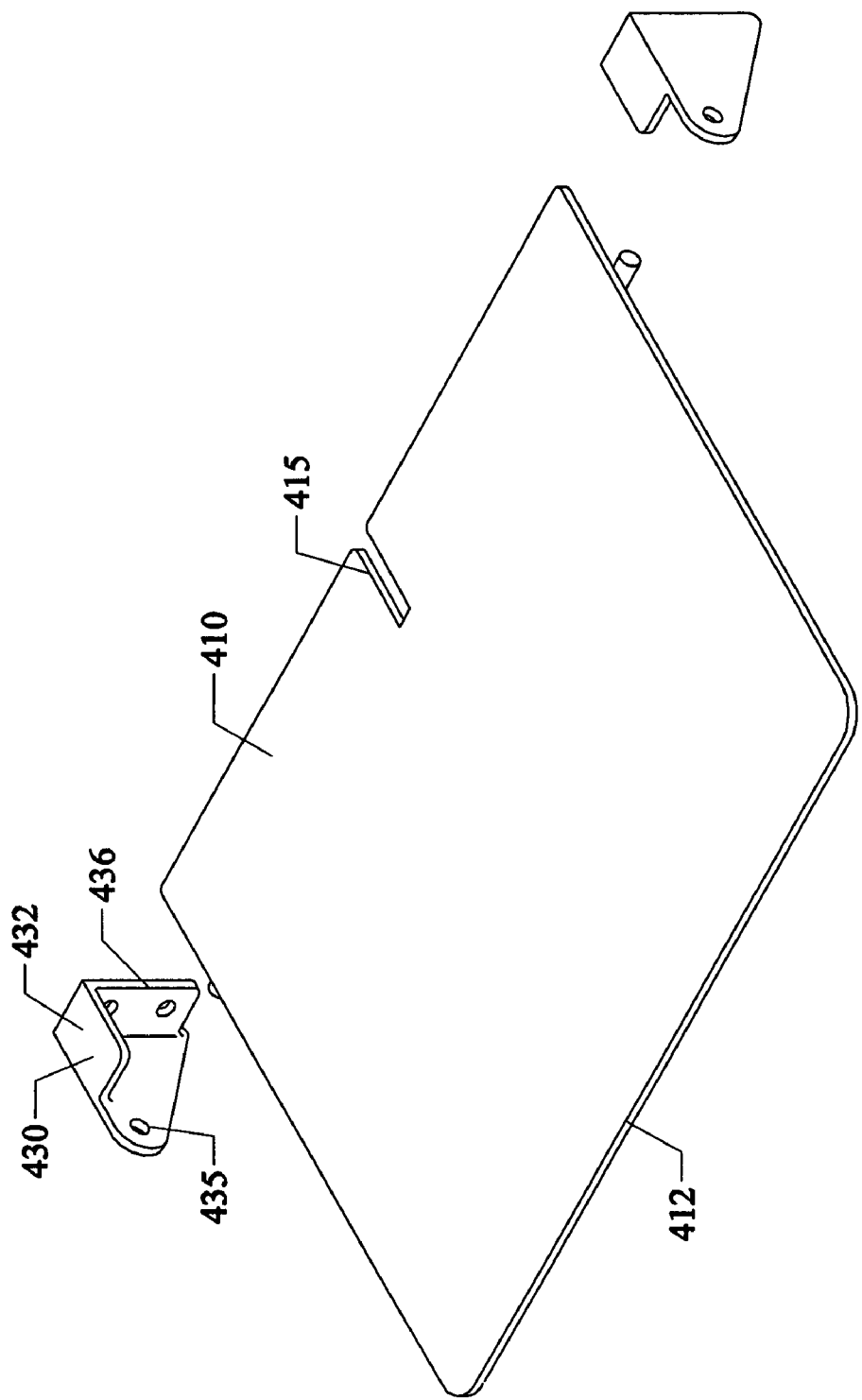
FIG. 14 is an exploded view of the fold down table and hinges of the preceding figures.

FIG. 10A is an enlarged view of one of the hinges 430 for the fold down table 400 of FIG. 10. FIG. 11 is a partial cross-sectional interior view of the device 1 with bench 500 seats and fold down table 400 in a folded up position. FIG. 11A is an enlarged view of one of the hinges 430 for the fold down table 400 of FIG. 11. FIG. 12 is an enlarged side view of the fold down table 400 of FIG. 10 in a down position. FIG. 13 is an enlarged side view of the fold down table 400 of FIG. 11 in an up position. FIG. 14 is an exploded view of the fold down table 400 and hinges 430 of the preceding figures.

Referring to FIGS. 10-14, the shelter 1 can include a folding table 400 that can be positioned between the dual bench seats 500. The table 400 can be used as a dining table and/or so that the occupants in the shelter can use the table top 410 for recreation such as playing cards or storing other devices such as radios, and the like, when the shelter 1 is being used.

The table 400 can include a rectangular table top 410 with a longitudinal bar fixably fastened underneath the table top 420 adjacent to a rear end of the table top 410. Fastened against the rear wall 40 of the shelter 1 can be a pair of hinge brackets 430 for the table 400. The hinge brackets 430 can each have an upper top portion that functions as a stopper portion to restrict the folding table top 410 to fold down into a horizontal position (perpendicular) to the rear walls 40 of the shelter 1. Side holes 435 in the hinges 430 allow for the outer ends of pivoting bar 420 to pass therethrough. The holes 435 allow the table top 410 to pivot to fold up or fold down relative to the brackets 430. The rear wall 436 of the hinge brackets can be each mounted to the rear walls 40 of the shelter by fasteners (not shown) such as, but not limited to bolts, screws, and the like. Alternatively, the rear wall 436 can be one longitudinal wall that connects the pair of brackets 430 to one another. Across a rear edge of the table top 412 can be a groove 415 to allow the table top 412 to fold up and fold down so the groove 415 passes about the bent edges 42 and rear spacer 220 of the rear wall panels 40.

The table top 410 can be folded up in the direction of arrow F and be held in a vertical position by a hook latch 440. The latch 40 can be L shaped with an upper hook end 442 having a lower angled front edge that allows latch 40 to move upward in the direction of arrow L by the front edge 412 of the table top 410 so that the latch 410 slightly pivots by a pivoting fastener 445. When the table top 410 is to be used, the user can push up on the front edge 443 of the upper hook end 442. The bottom leg 448 of the latch when hanging down by the force of gravity can press against the rear wall 40 and keep the upper hook end 442 perpendicular to the rear wall 40.

Window

Figure 16:
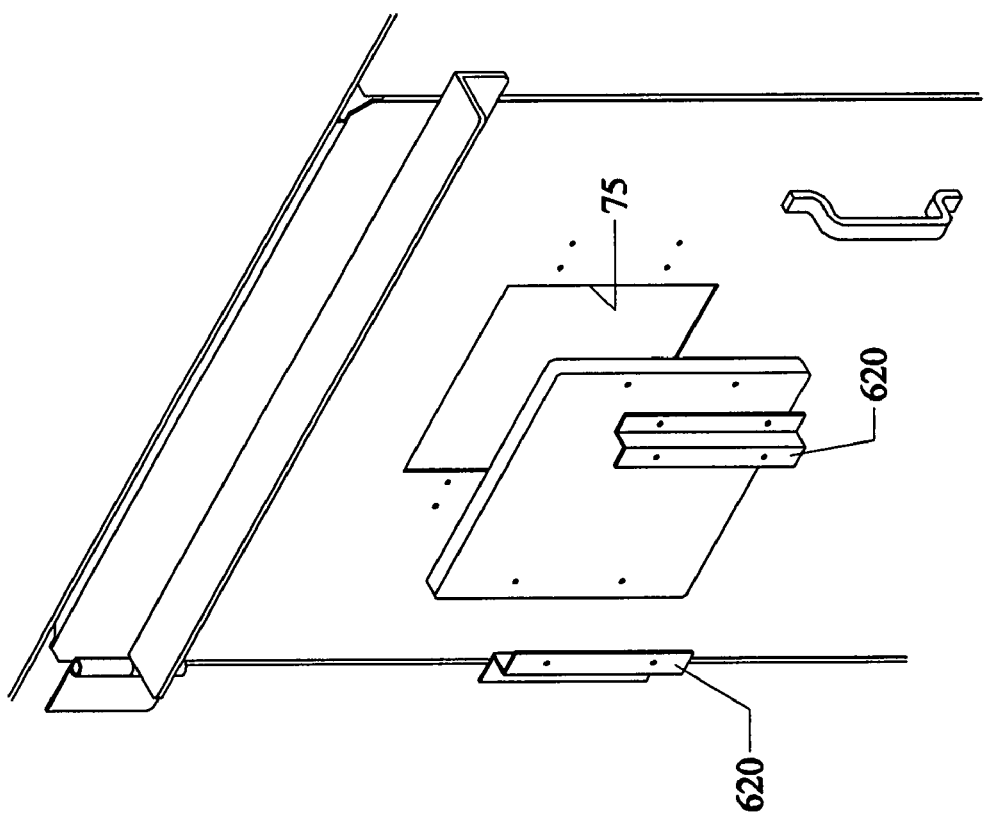
FIG. 16 is an exploded view of the window, brackets separated from the door of FIG. 15.
Figure 15:
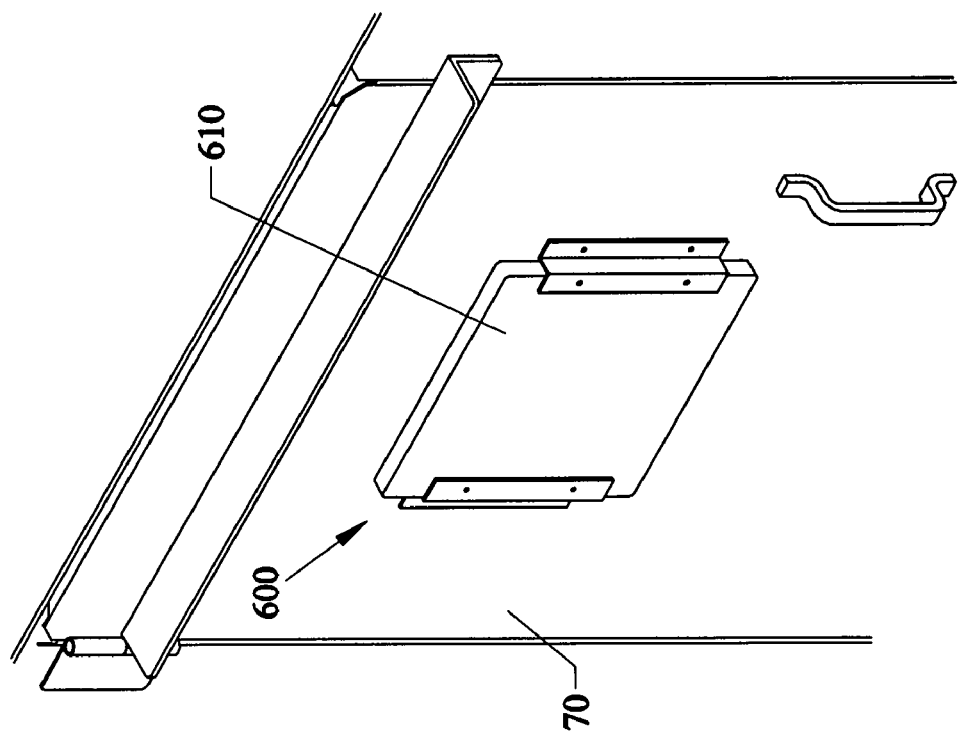
FIG. 15 is a view of a door for the device of the preceding figures with a window.

FIG. 15 is a view of a door 70 for the device 1 of the preceding figures with a window 600. FIG. 16 is an exploded view of the window panel 610 and brackets 620 separated from the door 70 of FIG. 15.

Referring to FIGS. 15-16, a window 600 can be used with the invention that can let in light, but be strong enough for use in windstorms. A window panel 610 such as LEXAN, bullet proof glass, and the like, can be mounted over an opening 75 in the door 70 by a pair of S/Z shaped mounting brackets 620, formed from metal, such as galvanized metal, and the like. The latter of which can be fastened to the door 70 about the window pane 610 by fasteners, such as but not limited to screws, bolts, and the like.

Figure 18:
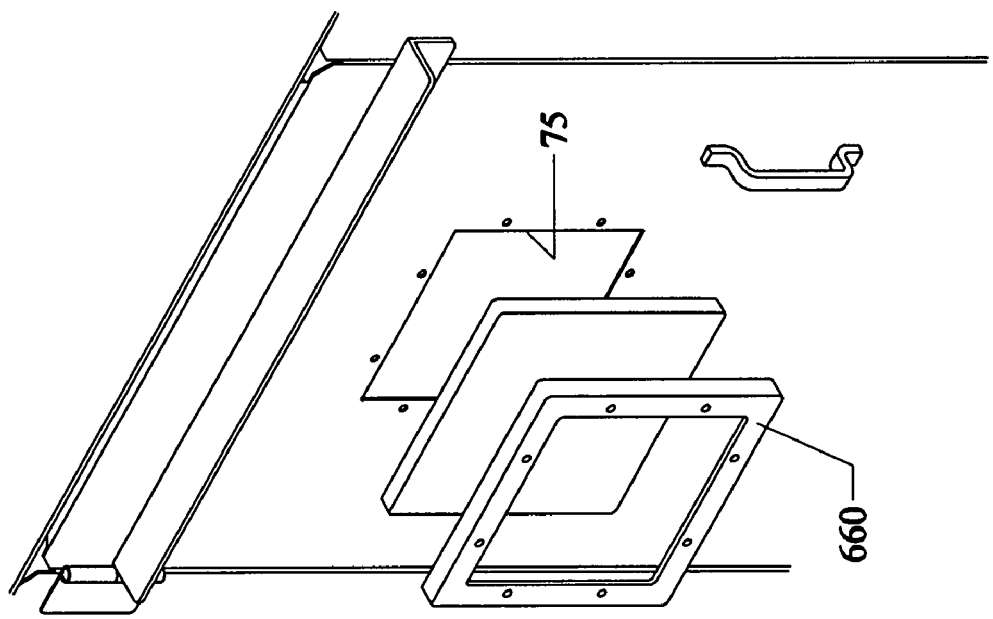
FIG. 18 is an exploded view of the window, brackets separated from the door of FIG. 17.
Figure 17:
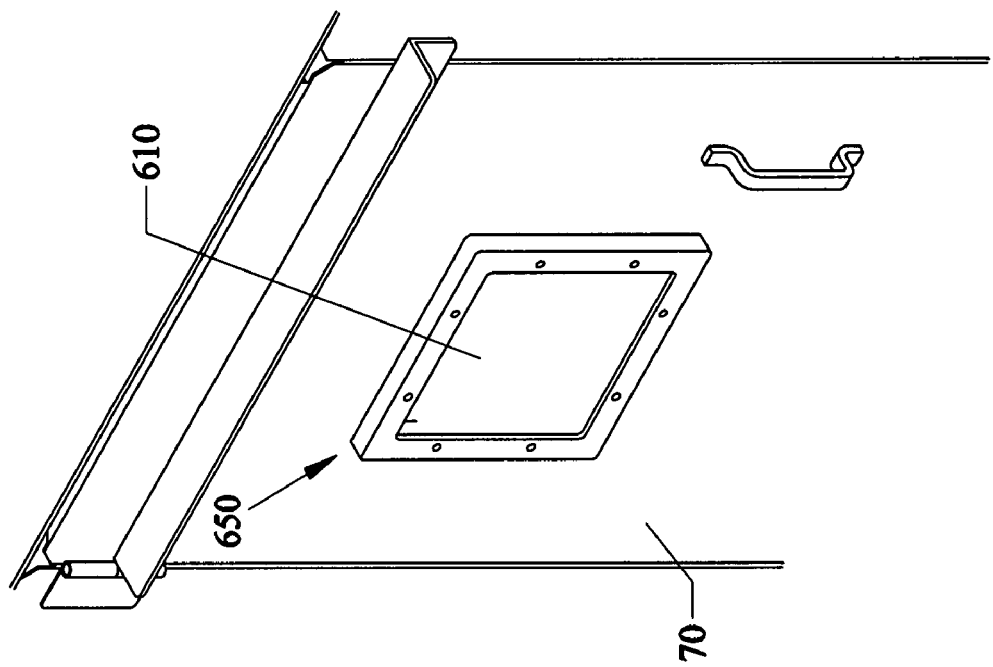
FIG. 17 is a view of a door for the device of the preceding figures with another window.

FIG. 17 is a view of a door 70 for the device 1 of the preceding figures with another window 650. FIG. 18 is an exploded view of the window panel 610 and bracket 660 separated from the door 70 of FIG. 17. A rectangular bracket frame 660 can also be fastened to the door 70 about the window pane 610 by fasteners, such as but not limited to screws, bolts, and the like.

Although the bench seats are shown be attached to fasteners in a fixed horizontal orientation, the bench seats can also be attached to fold up and down using components such as those used with the folding table 400.

While the preferred embodiment describes assembling and using the shelter, the novel shelter can be easily disassembled and relocateable to other sites.

Although the preferred embodiment describes the shelter for use on concrete pads and driveways, the shelter can be used inside of a structure such as a garage and carport, the invention can be located in other structures, such as on a concrete basement floor, on tiled floors, in warehouses, commercial buildings, in high-rise buildings, and the like. Additionally, the shelter can be used with its own foundation for applications such as adjacent to a mobile home, trailer park, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A relocatable personal and/or pet safety shelter, consisting of: a base; a left side wall panel, a rear side wall panel, a right side wall panel, a pair of front wall panels, all forming a rectangular frame attached to the base, each of the front wall panels being substantially identical to one another, the pair of front wall panels including a left front panel and a right front panel; a top panel attached to the top of the rectangular frame, the top panel forming a solid contiguous roof with no ventilation holes and openings above the rectangular frame; a single door attached to and located solely between each of the front wall panels for providing the only access into the shelter; a single handle protruding outward from the door, the single handle being positioned adjacent to one side of the door halfway between a top edge and a bottom edge of the door; a left bench seat inside of the shelter attached to the left side wall, the left bench seat having a length substantially and tightly filling all space between rear side wall panel and the left front panel, the left bench seat having a width less than a width of the left front panel so that the left bench seat sits away from the door; a right bench seat inside of the shelter attached to the right side wall, the right bench seat having a length substantially and tightly filling all space between rear side wall panel and the right front panel, the right bench seat having a width less than a width of the right front panel so that the right bench seat sits away from the door; a fold-down table attached to one of the side wall panels by a hinge, the table having a fold up vertical position against the one of the side panels and a fold down horizontal position having a table surface substantially above the right bench seat and the left bench seat that is adaptable to allow users to place their knees underneath the table, wherein the left and the rear and the right side wall panels, and the front pair of panels and the top panel and the door, and the left bench seat and the right bench seat and the fold down table, are easily assembled and disassembled; the shelter being constructed to withstand winds up to 450 mile per hour, the shelter having dimensions of approximately 60 inches long by approximately 30 inches wide by approximately 55 inches tall between the base and the top panel, and the shelter has a weight of no more than approximately 940 pounds.

2. The shelter of claim 1, wherein each bench seat includes: end brackets having ends attached to adjacent side walls for supporting each bench seat above the base in a fixed horizontal orientation, each of the end brackets has an elongated L shape with an elongated horizontal leg perpendicular to an elongated vertical leg, the elongated vertical leg having through-holes therethrough for allowing the end bracket to be attached to side walls with removable fasteners.

3. The shelter of claim 2, wherein each bench seat includes: an upper rectangular panel having a front edge and a rear edge having a length, and opposite side edges having a width;
a front wall extending downward along the length of the front edge; and
a rear wall extending downward along the length of the rear edge, the rear wall having a shorter length than the front wall so that the end brackets fit under the opposite side edges of the rectangular panel, with a front end of the brackets behind the front wall and a rear end of the brackets adjacent to the side wall panels of the shelter.

4. The shelter of claim 1, wherein each bench seat includes: a hinge for allowing each bench seat to fold up to a vertical orientation adjacent to one of the side walls, and to fold down to a horizontal orientation relative to the one of the side walls.

5. The shelter of claim 4, wherein the hinge includes: a rear edge attached to an inner surface to one of the side wall panels, an upper horizontal tab and a side tab perpendicular to the upper tab having a through-hole so that a protruding member on a side of each bench seat can be inserted into and pivot thereto, the upper tab being positioned above a rear edge portion of each bench seat so that the upper tab limits travel of each bench seat from the fold up vertical orientation to the fold down horizontal orientation.

6. The shelter of claim 5, wherein each bench seat includes two hinges each adjacent to opposite sides of the bench seat.

7. The shelter of claim 1 further consisting of: a latch pivotally attached to one of the side wall panels, the latch having a moveable hook head portion which is moveable by a front edge of the bench being pushed against the hook head portion, allows the latch to hold the bench seat in the fold up vertical orientation, the latch being pushed up allows the bench seat to move to the fold down horizontal orientation.

8. The shelter of claim 1, further consisting of: a hinge attached to one of the side wall panels; and a fold down table attached to the hinge, wherein the hinge allows the table to move from a fold up vertical orientation adjacent to one of the side walls, to a fold down horizontal orientation relative to the one of the side walls.

9. The shelter of claim 1, further consisting of: a hinge attached to the rear wall panel for supporting the fold down table; and a rear edge attached to an inner surface to one of the side walls, an upper horizontal tab and a side tab perpendicular to the upper tab having a through-hole so that a protruding member on a side of the table can be inserted into and pivot there to, the upper tab being positioned above a rear edge portion of the table so that the upper tab limits travel of the table from the fold up vertical orientation to the fold down horizontal orientation.

10. The shelter of claim 9, wherein the shelter includes two hinges each adjacent to opposite sides of the table.

11. The shelter of claim 9 further consisting of: a latch pivotally attached to one of the side wall panels, the latch having a moveable hook head portion which is moveable by a front edge of the table being pushed against the hook head portion, allows the latch to hold the table in the fold up vertical orientation, the latch being pushed up allows the table to move to the fold down horizontal orientation.

12. The shelter of claim 1 further consisting of: a single opaque exterior window panel that is resistant to windstorms of up to approximately 450 miles per hour, the exterior window panel being positioned solely outside the door over a single opening through the door, the exterior window panel having a length and width larger than a length and width of the opening in the door; exterior brackets attached about the edges of the window panel; and fasteners for attaching the exterior window panel to the door by the exterior brackets.

13. A relocatable personal and/or pet safety shelter, consisting of: a base; a left side wall panel, a rear side wall panel, a right side wall panel, a pair of front wall panels, all forming a rectangular frame attached to the base, each of the front wall panels being substantially identical to one another; a top panel attached to a top of the rectangular frame, the top panel forming a solid contiguous roof with no ventilation holes and openings above the rectangular frame; a single door attached to and located between the pair of front wall panels for providing the only access into the shelter, the single door being substantially wider than each of the front wall panels, wherein the shelter includes dimensions of approximately 60 inches long across the rear side wall panel and the pair of front wall panels, and approximately 30 inches wide along each of the left and right side walls, and the shelter being approximately 55 inches in height between the base and the top panel; a single handle protruding outward from the door, the single handle being positioned adjacent to one side of the door halfway between an upper edge and a lower edge of the door; a single opaque exterior window panel that is resistant to windstorms of up to approximately 450 miles per hour, the exterior window panel being positioned outside the door over a single opening in the door, the exterior window panel having a length and a width larger than a length and width of the opening through the door, and a bracket member attached about the edges of the window panel, and fasteners to attach the window panel solely to an outside surface of the door by passing through both the bracket member and the outside surface of the door; and a left bench seat inside the shelter attached to the left side wall panel, the left bench seat having a length substantially and tightly filling all space between rear side wall and a left front panel, the left bench seat having a width less than a width of the left side panel so that the left bench seat sits away from the door; a right bench seat attached to the right side wall panel opposite to the left bench seat, the right bench seat having a length substantially and tightly filling all space between the rear side wall and a right front panel, the right bench seat having a width less than a width of the right side panel so that the right bench seat sits away from the door, with the door located between the left bench seat and the right bench seat; a fold-down table attached to one of the side wall panels by a hinge, the table having a fold up vertical position against the one of the side panels and a fold down horizontal position perpendicular to the rear side panel, the fold down position having a table surface substantially above the right bench seat and the left bench seat that is adaptable to allow users to place their knees underneath the table, the table located between the left bench seat and the right bench seat, wherein the left side wall panel, wherein the rear side panel, the pair of front panels and the top panel and the door, and the bench seats and the table, are easily assembled and disassembled, the shelter being constructed to withstand winds up to 450 mile per hour.

14. The shelter of claim 13, wherein each of the bench seats includes:
   end brackets having ends attached to adjacent side walls for supporting the at least one bench seat above the base in a fixed horizontal orientation, each of the end brackets has an elongated L shape with an elongated horizontal leg perpendicular to an elongated vertical leg, the elongated vertical leg having through-holes therethrough for allowing the end bracket to be attached to side walls with removable fasteners;
   an upper rectangular panel having a front edge and a rear edge having a length, and opposite side edges having a width;
   a front wall extending downward along the length of the front edge; and
   a rear wall extending downward along the length of the rear edge, the rear wall having a shorter length than the front wall so that the end brackets fit under the opposite side edges of the rectangular panel, with a front end of the brackets behind the front wall and a rear end of the brackets adjacent to the side wall panels of the shelter.

15. The shelter of claim 3, wherein: the left bench seat is attached in a fixed horizontal orientation by the end brackets to the side wall panels inside of the shelter to the left of the door; and the right bench seat is attached in a fixed horizontal orientation by the end brackets to the side wall panels inside of the shelter to the right of the door.

\* \* \* \* \*